Feb. 18, 1969 JAMES E. WEBB 3,428,919
ADMINISTRATOR OF THE NATIONAL AERONAUTICS
AND SPACE ADMINISTRATION
SIGNAL MULTIPLEXER
Filed Feb. 9, 1966

INVENTOR
Robert C. Kinsel
BY
ATTORNEY

United States Patent Office 3,428,919
Patented Feb. 18, 1969

3,428,919

SIGNAL MULTIPLEXER

James E. Webb, Administrator of the National Aeronautics and Space Administration, with respect to an invention of Robert C. Kinsel, Cincinnati, Ohio Filed Feb. 9, 1966, Ser. No. 526,664
U.S. Cl. 333—8 2 Claims
Int. Cl. H01p 5/12

ABSTRACT OF THE DISCLOSURE

A passive device for coupling a signal into a plurality of similar outputs wherein each output will have the same impedance as the input, where said impedance is adjustable, and where the input loop comprises a series connected circuit including the primary of a first transformer the primary of a second transformer and the secondary of said first transformer.

The invention described herein may be manufactured and used by or for the Government of the United States of America or governmental purposes without the payment of any royalties thereon or therefor.

This invention relates to an impedance transformation device involving multiple signal ports and more specifically to a passive circuit for routing a single signal circuit simultaneously into two or more similar circuits of like characteristic impedance. The system is reversible so as to provide mixing or combining functions to yield a single output and means are provided for frequency selection, phase adjustment and impedance transformation to match input-output requirements.

It is known that in order to obtain maximum transfer of power from one circuit to another, the impedance of both circuits must be matched. If such unmatched sources and loads are connected directly, much of the available power will not be transferred to the load. A well known and common method of permitting the transfer of maximum power is the introduction of a transformer with the proper turns ratio between the source and the load. However, in many instances it may be required to couple a source having a characteristic impedance of greatly varying magnitude to a plurality of output devices and to provide to the output devices the same characteristic impedance. Accordingly, a salient feature of the invention is impedance transformation providing for the same output impedance as that of the input in multi-channel distribution. For example, one may wish to couple a pair of radio receivers to the same antenna so as to permit no appreciable degradation in the system performance.

Although the system of the present invention provides for an impedance transformation wherein the same impedance appears at both the input and the output, the truly successful circuit, such as that set forth and illustrated, has optimized a number of other parameters. For example, previous attempts in this field failed to provide, or in some instances recognize, the relationships of other parameters such as phasing, broad band frequency acceptance, power losses, balancing the power, and signal isolation of the outputs. To be completely successful, the impedance transformation must lend cognizance to controlling the phase, providing a frequency-impedance control input system, balancing the power transformation into matched loads, providing a substantially lossless power transformation, permitting a broad band frequency acceptance and transfer with controlled phase relationship, supplying high electrical or signal isolation of output ports where desired, be adaptable to miniaturization techniques, and, be completely reversible so that the device will operate as a combiner or signal mixer as well as a signal diplexer. The foregoing are all achieved by the present invention which is incorporated into a completely passive transformation network.

Accordingly, it is the principal object of the present invention to improve apparatus for effecting the efficient transfer of energy between systems.

It is a further object of the present invention to provide a means for effecting impedance transformations between a source and an output system without significant signal attenuation.

It is a further object of the present invention to provide a system for effecting single-ended division to dual circuits of the same characteristic impedance.

It is a further object of the present invention to provide an impedance transformation device providing for the same output impedance as that of the input in multichannel distribution.

It is a further object of the present invention to provide a means for effecting impedance transformations coupled with phase control of the signals.

It is a further object of the present invention to provide a device having substantially lossless power transfer from input to balanced outputs.

It is a further object of the present invention to provide a device having the ability to optimize a broad band frequency transfer at a center frequency position.

It is a further object of the present invention to provide an impedance transformation device which is reversible due to its capability of combining multi-signal circuits into one channel or providing multi-signal outputs from a single input.

It is a still further object of the present invention to provide an apparatus having a single ended input divided into a double ended output of equal impedance or a push-pull output of magnified impedance.

These and other object of the present invention are accomplished by the present invention which may accept a single input of one impedance and provide a substantially lossless output to a pair of output terminals each of which has the same impedance as the input. Further, the apparatus is completely reversible so that a pair of input signals may be combined or mixed and delivered to an output terminal or port, the impedance at the inputs and the output being substantially of the same magnitude.

In the preferred embodiment which is described and illustrated, three electrical loops are provided which include three electrical signal ports. In one embodiment, one of the signal ports is used as an input while the two remaining ports are outputs. In its other embodiment, two of the ports are input terminals while the third port serves as an output terminal. The three electrical loops are so defined that two of the loops have certain common circuit elements. More specifically, a first loop in circuit with one output port includes an input network, the primaries of a pair of transformers, and the secondary of the first transformer. The second electrical loop includes the input network, the primary of the first transformer, a phase correction element, and the second of the signal ports. The third loop includes the secondary of the other of the transformers as well as a tank circuit and the third signal port. The tank circuit is also coupled to the secondary of the first transformer. Adjustable circuit elements are provided so as to yield a double tuned system wherein the adjustable elements may be tuned for the proper frequency and at the same time automatically effect the actual impedance adjustments of the input and output ports.

The invention both as to its organization and method of operation together with further objects and advantages thereof will best be understood by reference to the following specification taken in conjunction with the accompanying drawings in which.

The present invention which is herein described and illustrated comprises a novel circuitry means for routing a single signal circuit simultaneously into two or more similar circuits of like characteristic impedance. Further, the circuit is reversible in that a pair of signals may be combined and/or mixed so as to yield a single output signal. Again the output impedance is that of the input. Means are provided for frequency selection, phase adjustment, and impedance transformation to match input-output requirements. The device is entirely passive and many and very complex ramifications are expected to evolve which employ the principles of the present invention. Many applications of the invention are known such as in the fields of communications, receiving equipment, data processing and data transfer. Countless other applications will be evident to those skilled in the art.

Figure 1:
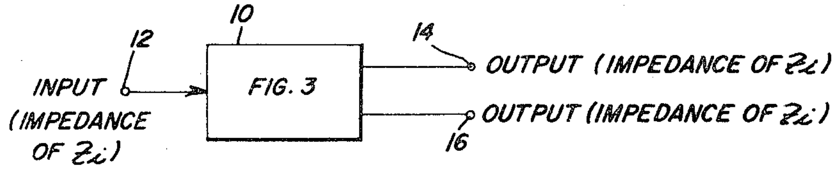
FIGURE 1 is a block diagram of the invention and illustrating the form of the invention wherein a single input forms a pair of outputs, the input and the outputs being of substantially equal impedance.
Figure 3:
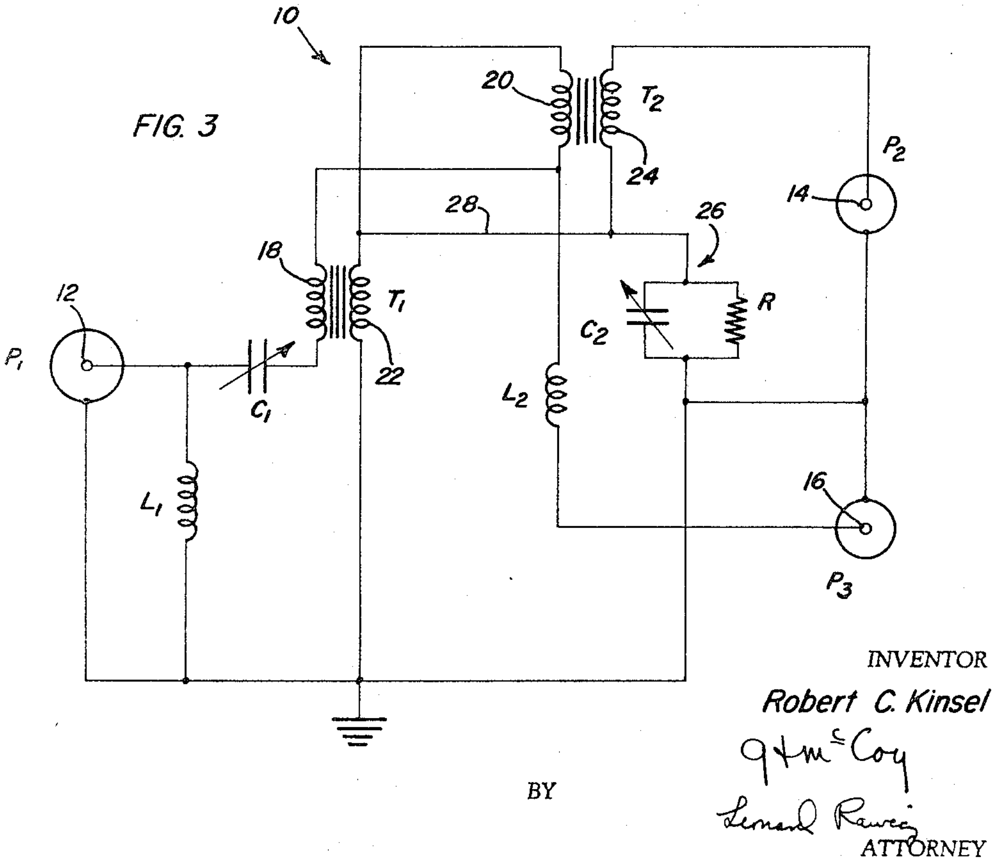
FIGURE 3 is a schematic diagram of the invention illustrated in the blocks of the FIGURES 1 and 2.

The FIGURE 1 illustrates in block form the circuit having an input 12 and a pair of outputs 14 and 16, a block 10 being further described in the FIGURE 3. In the embodiment, a single signal is being routed to a pair of outputs, the device providing for an impedance transformation which is the same for the input as the output.

Figure 2:
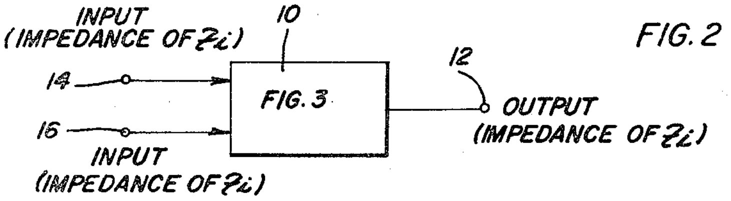
FIGURE 2 is a block diagram of another form of the invention and illustrating a pair of inputs being combined to form a single output, the inputs and the output being of substantially equal impedance.

In the FIGURE 2, the input terminal 12 has been transformed into an output terminal 12 while the output terminals 14 and 16 are now input terminals 14 and 16. The circuitry of the block 10 will be discused in detail with subsequent reference to the FIGURE 3. In the FIGURE 2, it will be noted that when the signal mixer or combiner configuration is utilized, the input impedance is also substantially equal to the output impedance.

The circuit of the block 10 in the FIGURES 1 and 2, is illustrated in schematic form in the FIGURE 3. The circuit and the noted parameters represent the preferred embodiment. The circuitry set forth operates in the VHF range at relatively low signal powers and may be adapted to essentially any frequency tolerating lumped parameters in the form illustrated. This concept is adaptable to networks involving a large number of channels emanating from one or more signal sources and vice versa. Although a prime function of the circuit is impedance transformation providing for the same output impedance as that of the input in multi-channel distribution, many further important features are evident such as the essentially lossless power transfer from input to balanced outputs and the ability of the circuit to optimize a broad band frequency transfer at a center frequency position. The outputs of the circuit are phased such that they may be in push-pull relationship whenever desirable.

For the purposes of explanation, a single circuit signal entry at the input terminal 12 of the port $P_1$ will be assumed which is transformed to two similar outgoing circuits of the same impedance at the terminals 14 and 16 of the ports $P_2$ and $P_3$, respectively. The incoming signal is applied to a variable capacitor $C_1$ and inductor $L_1$ which forms a resonating network. The capacitor $C_1$ is coupled in series to a primary winding 18 of a transformer $T_1$, a primary winding 20 of the transformer $T_2$, a secondary winding 22 of the transformer $T_1$ and then to ground. The opposite end of the inductor $L_1$ is also coupled to ground, as shown, as well as the annular conductors about the ports $P_1$, $P_2$ and $P_3$.

A division circuit between the primary windings 18 and 20 of the transformers $T_1$ and $T_2$, respectively, feeds directly through an inductor $L_2$ to the terminal 16 of the port $P_3$. The transformer primaries 18 and 20 are of similar characteristics in that they represent a parallel signal divider circuit in series with the inductor $L_2$ to the output port $P_3$. The inductor $L_2$ serves primarily as the phase correction parameter means. The value of the inductor $L_2$ is somewhat critical as determined by the impedance match of the input-to-output requirements. In the particular embodiment which is illustrated and described, a 50 ohm input is divided into two 50 ohm output circuits.

The secondary winding 22 of the transformer $T_1$ and a secondary winding 24 of the transformer $T_2$ similarly form a circuit divider through an R-C network 26 to the ground side of both the ports $P_2$ and $P_3$. The network 26 includes a fixed resistor R and a variable capacitor $C_2$. It will be noted that the resistor R and the capacitor $C_2$ are directly in the secondary loop of the transformer $T_1$. The R-C circuit 26 serves to regulate the voltage delivered by the secondary winding 24 of the transformer $T_2$ to the terminal 14 of the port $P_2$ as well as to serve in low tuning the secondary winding 22 of the transformer $T_1$. The transformers $T_1$ and $T_2$ may comprise similar bifilar windings on powdered iron toroidal cores. In the particular illustrative embodiment, six and one-half turns of paired 3/36 wire on a $\frac{3}{16}$ inch diameter core was employed.

It will be observed that the circuit of the FIGURE 3 may be viewed as including three electrical loops although the loops may be open at certain points and may not necessarily indicate the presence or direction of current flow: the first loop is observed to include, from the terminal 12 of the port $P_1$, the capacitor $C_1$, the primary winding 18 of the transformer $T_1$, the primary winding 20 of the transformer $T_2$, the secondary winding 22 of the transformer $T_1$, the ground terminal, and the inductor $L_1$; the second loop is observed to include a portion of the first loop and more specifically, includes the capacitor $C_1$, the primary winding 18 of the transformer $T_1$, the inductor $L_2$, the terminal 16 of the port $P_3$, the ground terminal and the inductor $L_1$; and, the third loop includes the R-C circuit 26, the secondary winding 24 of the transformer $T_2$, and the terminal 14 of the port $P_2$. Lastly, a conductor 28 connects the secondary winding 22 of the transformer $T_1$ to the secondary winding 24 of the transformer $T_2$.

The circuit of the FIGURE 3 includes a pair of capacitors $C_1$ and $C_2$ for providing fine tuning adjustments. One of the capacitors ($C_1$) serves for broad tuning of the circuit frequency. For example, assume that the system is adjustable to a center frequency of 150 megacycles and capable of passing a band + or −15 megacycles of that center frequency. The capacitor $C_1$ serves to optimize the admission band such that it would be peaked at the 150 megacycle point and fall gradually to approximately −3 decibels at approximately 45 megacycles either side of the peaked frequency. The capacitor $C_1$ simultaneously tunes the first and second loop as hereinbefore described. The two tuning capacitors $C_1$ and $C_2$, due to the transformer action of the circuit, are inductively coupled such that they form in effect a double tuned transformer system. In addition and simultaneously thereto, the capacitors $C_1$ and $C_2$ automatically effect the actual impedance adjustments of the input and output ports.

The present circuit is capable of phase adjustment to provide true push-pull output conditions. This is accomplished through the inclusion of the inductor $L_2$. The inductor $L_2$ would be made variable as required. The circuit may be utilized to provide a push-pull output 4 times the impedance of the input in circuitry shown in the FIGURE 3.

Thus, there has been described and illustrated a completely passive transformation network whose salient feature is impedance transformation providing for the same output impedance as that of the input in multi-channel distribution. Further salient and important features of the invention include: a single-ended input divided into a double-ended output of equal impedance or a push-pull output of magnified impedance; phase controlled impedance transformations; a combined frequency-impedance controlled input system; balanced power transformation into matched loads; is essentially a lossless power transformation; a broad band frequency acceptance and transfer with controlled phase relationships; high electrical or signal isolation of output ports when desired; adaptability to miniaturization techniques; a completely reversible operation; will serve as a combiner or signal mixer; and, may be employed as a signal diplexer.

Although suggestions as to possible uses of the circuit have previously been set forth, the utility of the invention will expand as the art progresses. There appears to be no limitation to the application of the present invention in multiplexing and other operations.

Thus, the present invention may be embodied in other specific forms without departing from the spirit and the essential characteristics of the invention. The present embodiment is, therefore, to be considered in all respects as illustrative and the scope of the invention being indicated by the appended claims rather than the foregoing description, and all changes which come within the meaning and range of the equivalency of the claims are, therefore, intended to be embraced therein.

What is claimed is:

1. Apparatus for coupling a variety of signal sources to loads, said apparatus comprising at least first, second and third signal ports, each of said ports having two terminals, one terminal of each port being at a common reference potential, said apparatus further comprising:

a first loop, said first loop being series connected and comprising a first inductor connected to said common reference potential on one side, the other side of said inductor being connected to one side of a capacitor at a first tie point, one side of the primary of a first transformer being connected to the other side of said capacitor, one side of the primary of a second transformer being connected to the other side of the primary of said first transformer, one side of the secondary of said first transformer being connected to the other side of the primary of said second transformer, the other side of the secondary of said first transformer being connected to said common reference potential and, the other terminal of said first signal port being connected to said capacitor at said first tie point;

a second series loop including said first inductor, said capacitor, and the primary of said first transformer, and further comprising a second inductor being connected on one side to the said other side of the primary of said first transformer, the non-common terminal of said third signal port being connected to the other side of said second inductor;

a third loop including the secondary of said second transformer, one side of said secondary of said second transformer being connected to the non-common terminal of said second port, the other side of said secondary of said second transformer being connected to an R-C circuit, the other side of said R-C circuit being connected to said common reference potential.

2. The apparatus as defined in claim 1 wherein said capacitor and said first inductor form a variable tuning resonance circuit.

References Cited

UNITED STATES PATENTS

| | | | |
|---|---|---|---|
| 2,002,844 | 5/1935 | Aceves et al. | 333—8 X |
| 2,470,307 | 5/1949 | Guanella | 333—25 X |
| 2,734,169 | 2/1956 | Douma | 333—10 X |
| 2,776,408 | 1/1957 | Tongue | 333—8 |
| 3,048,798 | 8/1962 | Simons | 333—11 X |
| 3,146,409 | 8/1964 | Lalmond | 333—8 |
| 3,273,079 | 9/1966 | Curtis | 333—11 |

HERMAN KARL SAALBACH, *Primary Examiner.*

M. NUSSBAUM, *Assistant Examiner.*

U.S. Cl. X.R.

333—25